United States Patent Office 2,924,507
Patented Feb. 9, 1960

2,924,507

PROCESS FOR RECOVERING LITHIUM VALUES

John A. Peterson, Arlington Heights, Ill., assignor to International Minerals & Chemical Corporation, a corporation of New York No Drawing. Application March 28, 1957
Serial No. 649,006

8 Claims. (Cl. 23—27)

This invention relates to the recovery of lithium values from lithium-bearing ores and is particularly directed to a process for recovering lithium values from spodumene.

Various methods have been utilized in the past for recovering lithium values from lithium-bearing ores. According to one procedure, the ore is totally or partially decomposed with an acid, such as sulfuric acid or fluosilicic acid. According to another procedure, an ore is fused or sintered with an inorganic compound, for example calcium sulfate, calcium chloride, calcium carbonate, or calcium oxide, or a mixture thereof, and the lithium salts are extracted from the fusion products by means of mineral acids. Another method involves base-exchange techniques, in which lithium ions are replaced in the ore lattice by alkali-metal ions or hydrogen ions. This procedure is carried out by treating an ore with a molten alkali sulfate or chloride or an aqueous solution of such a salt at elevated temperature under superatmospheric pressure. Still another method involves conversion of the lithium compounds in the ore to lithium chloride, followed by volatilization of the lithium chloride at high temperature.

The methods used in the past for recovering lithium values from lithium-bearing ores generally have the serious disadvantage that they remove from the ore relatively large quantities of impurities which may take the form of aluminum or iron salts or similar materials. Many processes heretofore utilized also have been expensive and/or cumbersome to operate.

An object of this invention is to provide a simple and efficient process for recovering lithium values from lithium-bearing ores, in particular from spodumene.

Another object is to provide a process for treating spodumene and recovering lithium values therefrom substantially entirely free from impurities.

Another object is to provide a method for treating spodumene at elevated temperature and converting the lithium values therein into soluble form, while avoiding sintering and fusion of the reaction mixture.

Another object is to provide a method for heat-treating spodumene in a rotary kiln and converting the lithium values therein into soluble form, while avoiding fusion and ringing within the kiln.

The present invention is an improvement upon the invention described and claimed in my co-pending application, Serial No. 448,743, filed August 9, 1954, now abandoned, of which the present application is a continuation-in-part. In said earlier invention, calcined spodumene is reacted with the acetate or formate salt of sodium or potassium at a temperature above the melting point of said salt. The lithium values are converted thereby into soluble form, and are readily leached from the treated ore with water.

In the present invention, sodium carbonate or potassium carbonate is incorporated in the calcination mixture of my earlier process. For example, beta-spodumene is commingled with sodium formate and sodium carbonate and heated to the fusion temperature of sodium formate. The extent of lithium recovery can be materially improved in this way, and in addition the tendency of the reaction mixture to soften or fuse is largely eliminated, so that caking, ringing, and clogging do not occur in the reaction vessel.

My invention thus comprises calcining beta-spodumene in admixture with a salt selected from the group consisting of sodium formate, sodium acetate, potassium formate, and potassium acetate, and another salt selected from the group consisting of sodium carbonate and potassium carbonate. Mixtures of salts may also be employed if desired, e.g. a mixture of sodium formate, acetate, and carbonate, or a mixture of the corresponding potassium salts, or a mixture of sodium and potassium salts of the defined groups. Distinctly superior results are obtained, however, from a mixture of sodium formate and sodium carbonate, as well as from a mixture of potassium formate and potassium carbonate.

In accordance with my invention, a sufficient quantity of sodium or potassium carbonate is incorporated in the reaction mixture to provide between about one-sixth and about five-sixths of the total alkali metal in the reaction mixture, preferably between about one-third and about two-thirds. The presence of sodium or potassium carbonate in the reaction mixture during the reaction results in higher recoveries of lithium values from the spodumene than is possible in the complete absence of said carbonates, while at the same time allowing for economy with respect to the amount of lower organic acid salt required. Sodium or potassium carbonate may be utilized to reduce the quantity of lower organic acid salt required by as much as about 80%.

In carrying out the process of the invention, spodumene ore is heated at about 1000° C. for about one hour to convert the alpha-spodumene therein into beta-spodumene, which reacts more rapidly and completely in the succeeding steps of the process. The calcined material is comminuted, if necessary, and comminged with sodium formate and sodium carbonate or other salts as set forth hereinabove. It is desirable that the materials be in intimate contact, and this can be furthered by pelletizing the mixture. The combined materials are then heated to a temperature at or above the melting point of the organic salt in its anhydrous form, and preferably to a temperature above about 200° C. in any case, for a time sufficient to permit the reaction to go to completion, that is, until substantially all of the lithium ions in the spodumene have been replaced by alkali metal ions from the salts that were commingled therewith. The temperature should not, of course, exceed the level at which substantial decomposition of the organic salt occurs. The reaction temperature and time required in any given instance will vary depending upon the particular salts utilized, the purity of the spodumene being treated, the degree of contact between the salts and the spodumene, the particle size of the spodumene, and related factors. When the organic salt is sodium formate, the reaction is suitably carried out at a temperature above 253° C. and preferably at a temperature between about 270 and about 300° C. for a period of about 30 minutes to about 1.5 hours. When sodium acetate is employed, the preferred temperature range is between about 335 and about 350° C. for a period of at least 5 minutes and preferably from about 10 minutes to about 1.5 hours. The reaction generally may be carried out in less than about 2 hours and in some instances in as short a time as 5 minutes. Usually the reaction time will be from about 10 minutes to about 1.5 hours, when the spodumene is of a fineness of less than 50 mesh. It is always desirable to carry out the reaction at a temperature above the melting point of the sodium or potassium salt of the organic acid utilized, but preferably not in excess of 50° C. above said melting point. Higher temperatures may be used, but decomposition of the organic acid salt is accelerated at higher temperatures, resulting in lessened efficiency. At temperatures lower than the melting point of the salt, rates of reaction are slow and attainment of intimate contact between the salt and ore is difficult. At higher reaction temperatures the time required to complete the reaction will be correspondingly reduced.

Following completion of the reaction, the reaction product is treated with water to leach the water-soluble lithium values from the ore and to secure a solution containing lithium carbonate and lithium formate or acetate, depending upon which organic-acid salt was used in the heat treatment, together with sodium and/or potassium salts. The lithium values can be conveniently recovered therefrom by evaporation, whereby the comparatively insoluble lithium carbonate is precipitated and can be filtered off. Additional sodium carbonate or potassium carbonate can be introduced into the solution, if necessary, preferably before evaporation, to effect substantially complete precipitation of the lithium values.

The liquor remaining after separation of the lithium carbonate contains formate and/or acetate of sodium and/or potassium, together with any excess carbonate and ordinarily a small quantity of unprecipitated lithium. These values are readily recovered by evaporating the liquor to a thick slurry and recycling to treat a further quantity of spodumene. The water content of such a slurry serves as a pelleting aid for the new reaction mixture. Alternatively, the evaporation of the liquor can be carried to the point of yielding a solid, which can be dried if desired, comminuted, and recycled.

By means of the process of this invention, substantially all of the lithium values can be recovered without the attendant removal of any substantial amounts of silica, aluminum, iron, or other impurities.

The minimum quantity of sodium or potassium ions required to effect substantially complete recovery of the lithium is the quantity which is theoretically necessary to replace all of the lithium values in the starting material. The total quantity of sodium or potassium provided by the alkali metal carbonate and lower organic acid salt during the reaction should amount to at least about one atom per atom of lithium in the beta-spodumene being treated, and preferably between about 2.5 and about 3.5 atoms for each atom of lithium. Greater quantities of sodium or potassium may be used if desired; such quantities, however, simply add to the expense of the process.

The following examples illustrate specific embodiments of this invention. All parts and percentages are by weight unless otherwise indicated.

*Example 1*

Alpha-spodumene containing 3.44% lithium was heated at about 1100° C. for about 1 hour to effect transition to the beta-spodumene form. About 100 parts of the beta-spodumene were comminuted until 100% would pass through a 100 mesh screen, then intimately mixed with 33.8 parts of sodium formate and 52.4 parts of sodium carbonate and pelletized, utilizing about 8 parts of water. The pellets were heated for about 1 hour at about 290° C., at which temperature they retained their original shape. The hot pellets were quenched in about 1380 parts of water, and were disintegrated thereby. The slurry thus formed was agitated for one-half hour to dissolve soluble lithium values from the solid material in the slurry. The slurry was then filtered and the filtrate analyzed for lithium. It was found that the filtrate contained 87% of the lithium originally present in the ore. The filtrate was evaporated to about 90 parts to precipitate the lithium as lithium carbonate. The resulting slurry was heated to about 100° C. and immediately filtered to remove the lithium carbonate product. The product weighed 15.6 parts and comprised 99% lithium carbonate.

The lithium carbonate mother liquor was readily processed to recover the formate, carbonate, and lithium values therein. The liquor was evaporated to a dry solid weighing 60 parts and containing 75% (25.4 parts) of the input sodium formate, 66% (34.5 parts) of the input sodium carbonate, and 3.2% (0.11 part) of the input lithium. This was comminuted and recycled to treat a further quantity of beta-spodumene.

*Example 2*

Beta-spodumene prepared as in Example 1 and containing 3.44% lithium was added in the amount of about 100 parts to 40.8 parts of sodium acetate and 52.4 parts of sodium carbonate, and the mixture was intimately commingled and pelletized using about 8 parts of water. The pellets were heated for about 1 hour at 344° C. and extracted with about 1380 parts of water. Analysis of the aqueous extract liquor showed that 81.5% of the lithium values originally present in the ore had been extracted. The lithium values were recovered from the solution as lithium carbonate following the procedure of Example 1.

*Example 3*

A series of tests were carried out on the beta-spodumene of Example 1, following the procedure described therein, in which the ratio of sodium formate to sodium carbonate was varied, while the atomic ratio of total sodium to lithium was held constant at 3:1 in all of the tests. The results show a pronounced maximum in lithium recovery at a formate to carbonate molar ratio between about 2:1 and 1:2,

| Na:Li Atomic Ratio | | Lithium Extracted, percent |
|---|---|---|
| As Formate | As Carbonate | |
| 3 | 0 | 88 |
| 2 | 1 | 100 |
| 1.5 | 1.5 | 98 |
| 1 | 2 | 98 |
| 0.5 | 2.5 | 75 |
| 0 | 3 | 30 |

*Example 4*

Another series of tests were carried out using sodium acetate and sodium carbonate in varying ratios. In each test, ten parts of —50 mesh beta-spodumene containing 2.86% lithium were commingled with the sodium salts, heated 30 minutes at 344° C., and quenched in an excess of water. The solid mass was crushed as required and leached in the quench water at room temperature for one-half hour. The slurry was filtered, and the filtrate was analyzed for lithium. The results were as follows:

| Na:Li Atomic Ratio | | Lithium Extracted, percent |
|---|---|---|
| As Acetate | As Carbonate | |
| 3 | 0 | 83 |
| 2 | 1 | 91 |
| 1 | 2 | 91 |
| 0.5 | 2.5 | 81 |

The foregoing examples are intended only as illustrations of my invention and not as a measure of the scope thereof. Numerous modifications and equivalents of the invention will be apparent from the present description to those skilled in the art.

In accordance with the foregoing description, I claim as my invention:

1. A process for recovering lithium values from beta-spodumene which comprises commingling beta-spodumene, an organic alkali-metal salt selected from the group consisting of the sodium and potassium salts of formic and acetic acids, and an inorganic alkali-metal salt selected from the group consisting of sodium carbonate and potassium carbonate, the total quantity of said salts being sufficient to provide an atomic ratio of the alkali metal therein to the lithium in the beta-spodumene of at least 1, and the quantity of said carbonate salt being at least about one-sixth of the total quantity of said salts, heating the resulting mixture at a temperature intermediate the melting point of said organic salt in its anhydrous form and the temperature at which substantial decomposition of said organic salt occurs for a time sufficient to convert the lithium values in said beta-spodumene into water-soluble form, and dissolving the lithium values therefrom with water.

2. The process of claim 1 wherein said alkali-metal salts are employed in an amount sufficient to provide an atomic ratio of alkali metal therein to the lithium in the beta-spodumene between about 2.5 and about 3.

3. The process of claim 1 in which between about one-sixth and about fivxe-sixths of the total alkali metal is in the form of said inorganic salt.

4. The process of claim 1 in which between about one-third and about two-thirds of the total alkali metal is in the form of said inorganic salt.

5. The process of claim 1 wherein said alkali-metal salts are sodium salts.

6. The process of claim 1 wherein said alkali-metal salts are potassium salts.

7. A process for recovering lithium values from beta-spodumene which comprises commingling beta-spodumene with sodium formate and sodium carbonate in a proportion to produce an atomic ratio of sodium to the lithium in the beta-spodumene of at least 1, between about one-third and about two-thirds of the quantity of added sodium being in the form of sodium carbonate, heating the resulting mixture at a temperature above about 253° C. and below the temperature at which anhydrous sodium formate substantially decomposes for a time sufficient to convert the lithium values in said beta-spodumene into water-soluble form, and leaching the lithium values therefrom with water.

8. A process for recovering lithium values from beta-spodumene which comprises commingling beta-spodumene with sodium acetate and sodium carbonate in a proportion to produce an atomic ratio of sodium to the lithium in the beta-spodumene of at least 1, between about one-third and about two-thirds of the quantity of added sodium being in the form of sodium carbonate, heating the resulting mixture at a temperature above about 320° C. and below the temperature at which anhydrous sodium acetate substantially decomposes for a time sufficient to convert the lithium values in said beta-spodumene into water-soluble form, and leaching the lithium values therefrom with water.

References Cited in the file of this patent

UNITED STATES PATENTS

| | | |
|---|---|---|
| 2,021,986 | Colton | Nov. 26, 1935 |
| 2,230,167 | Sivander et al. | Jan. 28, 1941 |
| 2,662,809 | Kroll | Dec. 15, 1953 |
| 2,816,007 | Kroll | Dec. 10, 1957 |